No. 789,096.
Patented May 2, 1905.

UNITED STATES PATENT OFFICE.

PAUL JULIUS AND ERNST FUSSENEGGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

AZO DYE.

SPECIFICATION forming part of Letters Patent No. 789,096, dated May 2, 1905.

Application filed February 18, 1905. Serial No. 246,307.

*To all whom it may concern:*

Be it known that we, PAUL JULIUS and ERNST FUSSENEGGER, doctors of philosophy and chemists, subjects of the Emperor of Austria-Hungary, residing at Ludwigshafen-on-the-Rhine, in the Kingdom of Bavaria, German Empire, have invented new and useful Improvements in Azo Coloring-Matter Suitable for Use in the Form of its Lakes, of which the following is a specification.

Our invention relates to the production of an azo coloring-matter which, in the form of its lakes, possesses excellent properties, being very stable against the action of light.

Although the azo coloring-matters prepared from a mono-substituted anilin and beta-naphthol disulfo-acid R in the form of their lakes are, as a rule, worthless, we have discovered that the azo coloring-matter prepared by combining diazotized para-chlor-anilin with beta-naphthol disulfo-acid R possesses, in the form of its lakes, very beautiful shades and great coloring power and is also very stable against the action of light.

The following example will serve to further illustrate the nature of our invention, which, however, is not confined to this example. The parts are by weight.

Diazotize in the usual manner one hundred and twenty-seven and a half (127.5) parts of para-chlor-anilin and allow the clear diazo solution to run into a stirred solution of three hundred and fifty (350) parts of the sodium salt of 2-naphthol-3.6-disulfo-acid, to which also sufficient sodium carbonate has been added to maintain the whole alkaline. Stir for half an hour (thirty minutes) and then heat to a temperature of from fifty to sixty degrees centigrade, (50° to 60° C.) Complete the precipitation of the coloring-matter by means of common salt, filter off, and press and dry.

The coloring-matter consists of a brown-red powder which is easily soluble in hot water. Its barium salt possesses a deep blue-red color and is almost insoluble in water. Upon reduction with tin and hydrochloric acid it yields para-chlor-anilin and amido-naphthol disulfo-acid.

Now what we claim is:—

As a new article of manufacture the azo coloring-matter which can be obtained by combining diazotized para-chlor-anilin with 2-naphthol-3.6-disulfo-acid, which coloring-matter consists of a brown-red powder easily soluble in hot water, and which in the form of its barium salt is almost insoluble in water, and which upon reduction with tin and hydrochloric acid yields para-chlor-anilin and amido-naphthol disulfo-acid.

In testimony whereof we have hereunto set our hands in the presence of two subscribing witnesses.

PAUL JULIUS.
ERNST FUSSENEGGER.

Witnesses:
ERNEST F. EHRHARDT,
JOS. H. LEUTE.